United States Patent
Sawai et al.

(10) Patent No.: US 10,487,982 B2
(45) Date of Patent: Nov. 26, 2019

(54) HIGH-PRESSURE VESSEL

(71) Applicant: TOYOTA JIDOSHA KABUSHIKI KAISHA, Toyota-shi, Aichi-ken (JP)

(72) Inventors: Osamu Sawai, Okazaki (JP); Tomoyuki Kishida, Nisshin (JP); Keisuke Hori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/044,669

(22) Filed: Jul. 25, 2018

(65) Prior Publication Data
US 2019/0049067 A1 Feb. 14, 2019

(30) Foreign Application Priority Data

Aug. 10, 2017 (JP) .................. 2017-155785

(51) Int. Cl.
*F17C 1/06* (2006.01)
*F17C 1/16* (2006.01)

(52) U.S. Cl.
CPC ............... *F17C 1/06* (2013.01); *F17C 1/16* (2013.01); *F17C 2201/0109* (2013.01); *F17C 2203/0604* (2013.01); *F17C 2203/066* (2013.01); *F17C 2203/067* (2013.01); *F17C 2203/0621* (2013.01); *F17C 2205/0305* (2013.01); *F17C 2209/219* (2013.01)

(58) Field of Classification Search
CPC ...... F17C 1/06; F17C 1/16; F17C 2203/0621; F17C 2205/0305; F17C 2203/067; F17C 2203/066; F17C 2209/219; F17C 2203/0604; F17C 2201/0109; F17C 2270/0184; F17C 2270/0168; F17C 2223/036; F17C 2223/0123; F17C 2221/012; F17C 2201/056; F16J 13/00; F16J 12/00
USPC ......................................................... 220/626
See application file for complete search history.

(56) References Cited

U.S. PATENT DOCUMENTS 2,718,583 A * 9/1955 Noland .................. B29C 53/602
392/458
2,744,043 A * 5/1956 Ramberg .............. B29C 53/602
156/155
3,033,724 A * 5/1962 Stokes .................. B29C 63/105
156/187

(Continued)

FOREIGN PATENT DOCUMENTS

JP 2016-102547 A 6/2016

*Primary Examiner* — Kareen K Thomas
(74) *Attorney, Agent, or Firm* — Oliff PLC

(57) ABSTRACT

A high-pressure vessel includes a liner, an outer layer, a ferrule, and a seal member. The liner has a cylindrical shape, and is made of a first resin. The outer layer is joined to an outer peripheral surface of the liner, and is made of a second resin having a linear expansion coefficient that is lower than a linear expansion coefficient of the first resin. The ferrule is made of metal, is at least partly disposed radially inward of an inner peripheral surface of the liner, and is configured to provide communication between an internal space of the high-pressure vessel and an outside of the high-pressure vessel. The seal member is disposed between the inner peripheral surface of the liner and the ferrule, and is configured to seal a gap between the inner peripheral surface of the liner and the ferrule.

10 Claims, 3 Drawing Sheets

(56) References Cited

U.S. PATENT DOCUMENTS

| | | | | |
|---|---|---|---|---|
| 3,266,660 A * | 8/1966 | Ragettli | B29C 53/60 |
| | | | | 206/521 |
| 3,815,773 A * | 6/1974 | Duvall | F16J 12/00 |
| | | | | 220/590 |
| 4,438,858 A * | 3/1984 | Grover | B29C 53/602 |
| | | | | 220/590 |
| 4,699,288 A * | 10/1987 | Mohan | B29C 53/602 |
| | | | | 220/560.01 |
| 5,018,638 A * | 5/1991 | Auberon | F17C 1/06 |
| | | | | 220/590 |
| 5,025,943 A * | 6/1991 | Forsman | B29C 53/602 |
| | | | | 220/589 |
| 5,429,845 A * | 7/1995 | Newhouse | F17C 1/16 |
| | | | | 138/30 |
| 5,476,189 A * | 12/1995 | Duvall | F17C 1/16 |
| | | | | 220/588 |
| 5,499,739 A * | 3/1996 | Greist, III | B29C 53/602 |
| | | | | 138/30 |
| 5,556,601 A * | 9/1996 | Huvey | B29C 53/805 |
| | | | | 156/172 |
| 5,931,335 A * | 8/1999 | Cippitani | B60K 15/03006 |
| | | | | 137/382 |
| 8,231,028 B2 * | 7/2012 | Matsuoka | F16J 13/12 |
| | | | | 220/582 |
| 8,517,199 B2 * | 8/2013 | Shimizu | F17C 1/06 |
| | | | | 220/203.01 |
| 8,640,910 B2 * | 2/2014 | Novak | F17C 1/16 |
| | | | | 220/582 |
| 8,732,929 B2 * | 5/2014 | Inagi | B29C 53/602 |
| | | | | 29/419.1 |
| 8,783,504 B2 * | 7/2014 | Kleschinski | F17C 1/16 |
| | | | | 220/590 |
| 2008/0111322 A1 * | 5/2008 | Otsubo | F16L 55/1108 |
| | | | | 277/654 |
| 2009/0095796 A1 * | 4/2009 | Prakash | F17C 1/06 |
| | | | | 228/184 |
| 2011/0089181 A1 * | 4/2011 | Yamamoto | F17C 1/00 |
| | | | | 220/601 |
| 2012/0012593 A1 * | 1/2012 | Kuroiwa | B29C 70/32 |
| | | | | 220/660 |
| 2013/0186893 A1 * | 7/2013 | Claudel | F17C 1/06 |
| | | | | 220/62.11 |

* cited by examiner

COMPARATIVE EXAMPLE

HIGH-PRESSURE VESSEL

INCORPORATION BY REFERENCE

The disclosure of Japanese Patent Application No. 2017-155785 filed on Aug. 10, 2017 including the specification, drawings and abstract is incorporated herein by reference in its entirety.

BACKGROUND

1. Technical Field

The disclosure relates to a high-pressure vessel.

2. Description of Related Art

Japanese Unexamined Patent Application Publication No. 2016-102547 (JP 2016-102547 A) describes a technology pertaining to a pressure vessel including a liner made of a resin and having gas-barrier properties, and an outer layer made of a fiber-reinforced resin and disposed on the outer side of the liner. In the pressure vessel, an end portion of the liner is folded back inwardly and a ferrule is inserted into the portion folded back inwardly.

SUMMARY

In the related art described above, the end portion of the liner is formed so as to be folded back inwardly. Therefore, the liner cannot be produced by a simple method, such as extrusion molding. This increases the cost of producing the liner. On the other hand, if a liner with an end portion that is not folded back inwardly is employed instead of a liner with an end portion folded back inwardly, it is necessary to take measures for maintaining sufficient sealability between the liner and a ferrule.

The disclosure provides a high-pressure vessel configured to make it possible to employ a liner having a simple shape while maintaining sufficient sealability.

An aspect of the disclosure relates to a high-pressure vessel including a liner, an outer layer, a ferrule, and a seal member. The liner has a cylindrical shape. The liner is made of a first resin. The outer layer is joined to an outer peripheral surface of the liner. The outer layer is made of a second resin having a linear expansion coefficient that is lower than a linear expansion coefficient of the first resin. The ferrule is made of metal. The ferrule is at least partly disposed radially inward of an inner peripheral surface of the liner. The ferrule is configured to provide communication between an internal space of the high-pressure vessel and an outside of the high-pressure vessel. The seal member is disposed between the inner peripheral surface of the liner and the ferrule. The seal member is configured to seal a gap between the inner peripheral surface of the liner and the ferrule.

In the high-pressure vessel according to the above aspect of the disclosure, the outer layer is joined to the outer peripheral surface of the liner having a cylindrical shape and made of the first resin. The outer layer is made of the second resin having a linear expansion coefficient that is lower than the linear expansion coefficient of the first resin. In the above aspect of the disclosure, the liner has a cylindrical shape, that is, the liner has a simple shape. Therefore, the liner can be produced by a simple method, such as extrusion molding. This reduces the cost of producing the liner.

The outer layer is made of the second resin having a linear expansion coefficient that is lower than the linear expansion coefficient of the first resin, and the liner and the outer layer are joined to each other in an integrated manner. The ferrule made of metal is at least partly disposed radially inward of the inner peripheral surface of the liner, and the ferrule is configured to provide communication between the internal space of the high-pressure vessel and the outside of the high-pressure vessel. The seal member is disposed between the inner peripheral surface of the liner and the ferrule, and the seal member seals the gap between the inner peripheral surface of the liner and the ferrule.

The first resin and the second resin, which differ in linear expansion coefficient from each other, also differ from each other in rate of expansion and shrinkage due to a temperature change. This may cause a difference in the degree of expansion and shrinkage (a dimensional difference) between the first resin and the second resin.

In view of this, if the liner and the outer layer made of the second resin having a linear expansion coefficient that is lower than the linear expansion coefficient of the liner (i.e., the linear expansion coefficient of the first resin) are not joined to each other in an integrated manner, the liner expands and shrinks in the axial direction with respect to the outer layer. In contrast to this, in the above aspect of the disclosure, the outer layer and the liner are joined to each other in an integrated manner. Thus, expansion and shrinkage of the liner in the axial direction are restrained (i.e., at least partially prevented) by the outer layer because the outer layer is less likely to expand and shrink in the axial direction than the liner.

In the above aspect of the disclosure, the seal member is disposed between the inner peripheral surface of the liner and the ferrule. Thus, for example, when the liner expands and shrinks in the axial direction, the seal member slides in response to expansion and shrinkage of the liner, resulting in abrasion of the seal member. However, in the above aspect of the disclosure, the liner and the outer layer are jointed to each other in an integrated manner, so that expansion and shrinkage of the liner in the axial direction are restrained by the outer layer. As a result, the seal member is restrained from sliding.

In the high-pressure vessel according to the above aspect of the disclosure, the outer layer may be joined to the liner so as to cover the liner from an outer side, such that the outer peripheral surface of the liner contacts an inner surface of the outer layer over an entirety of a contact site where the outer layer and the liner are in contact with each other.

In the above configuration, the outer layer is joined to the outer peripheral surface of the liner, and thus the contact site where the outer layer is in contact with the liner covers substantially the entirety of the outer peripheral surface of the liner. Because the outer layer is joined to the liner over the entirety of the contact site, expansion and shrinkage of the entirety of the liner are restrained.

In the high-pressure vessel according to the above aspect of the disclosure, the ferrule may include an insertion portion provided on a first end side of the ferrule and inserted into the liner, a projection portion provided on a second end side of the ferrule, the second end side being on the opposite side of the ferrule from the first end side, and a central portion provided between the insertion portion and the projection portion, and an outer diameter of the insertion portion may be less than an outer diameter of the central portion.

In the high-pressure vessel according to the above aspect of the disclosure, the insertion portion may include a holding portion having an outer diameter that is less than an outer diameter of the remaining portion of the insertion portion, and the seal member may be disposed on the holding portion.

In the high-pressure vessel according to the above aspect of the disclosure, the ferrule may include a step portion extending in a radial direction of the ferrule and located between the central portion and the insertion portion, and one end of each of the liner and the outer layer in a longitudinal direction of the liner and the outer layer may be in contact with the step portion.

The high-pressure vessel according to the above aspect of the disclosure may further include a reinforcement layer made of a carbon fiber-reinforced resin and disposed radially outward of the outer layer.

In the high-pressure vessel according to the above aspect of the disclosure, the reinforcement layer may be provided on an outer peripheral surface of the central portion of the ferrule and at least a part of an outer peripheral surface of the projection portion of the ferrule.

The high-pressure vessel according to the above aspect of the disclosure may further include a holding plate having an annular shape and secured to an end surface of the insertion portion.

In the high-pressure vessel according to the above aspect of the disclosure, the holding portion may be provided on the first end side of the insertion portion such that the end surface of the insertion portion to which the holding plate is secured is an end surface of the holding portion, and an outer diameter of the holding plate may be greater than the outer diameter of the holding portion.

The high-pressure vessel according to the above aspect of the disclosure may include two ferrules, and one of the two ferrules may be disposed at the one end of each of the liner and the outer layer in the longitudinal direction, and the other one of the two ferrules may be disposed at the other end of each of the liner and the outer layer in the longitudinal direction.

The high-pressure vessel according to the above aspect of the disclosure produces an advantageous effect of making it possible to employ a liner having a simple shape while maintaining sufficient sealability.

Further, the high-pressure vessel according to the above aspect of the disclosure produces an advantageous effect of restraining expansion and shrinkage of the entire liner.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, an example embodiment of the disclosure will be described with reference to the accompanying drawings.

Figure 1:
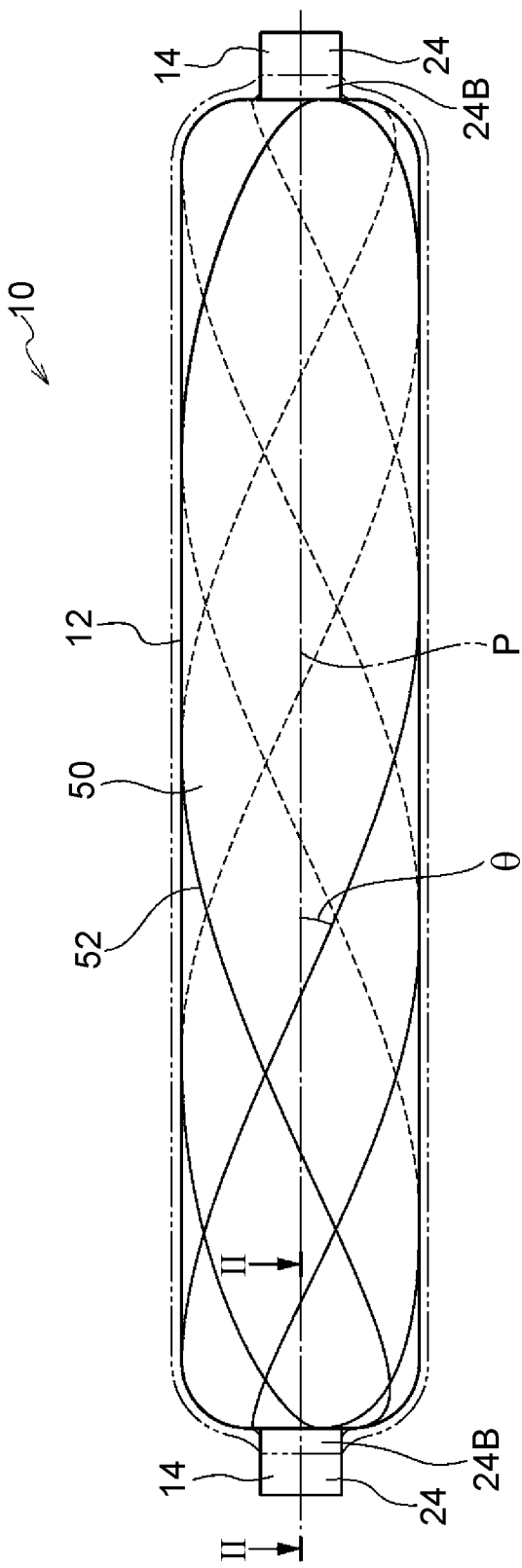
FIG. 1 is a side view schematically illustrating a high-pressure vessel according to an embodiment of the disclosure.

A tank module mounted in a vehicle (not illustrated) is, for example, an assembly of a plurality of high-pressure tanks 10 illustrated in FIG. 1, each of which serves as a high-pressure vessel. Examples of such a tank module include an assembly of a plurality of high-pressure tanks 10 arranged below, in the vehicle-height direction, a floor panel (not illustrated) of a fuel cell vehicle.

Configuration of High-Pressure Vessel

First, the configuration of the high-pressure tank 10, which is an example of a high-pressure vessel according to the present embodiment, will be described.

As illustrated in FIG. 1, the high-pressure tank 10 has a generally cylindrical shape. The high-pressure tank 10 is disposed, for example, such that the axial direction (i.e., the longitudinal direction) of the high-pressure tank 10 is parallel to the vehicle-width direction or the vehicle front-rear direction. The diameter of the high-pressure tank 10 is set such that the high-pressure tank 10 can be accommodated in a vacant space below the floor panel (not illustrated) in the vehicle-height direction.

Figure 2:
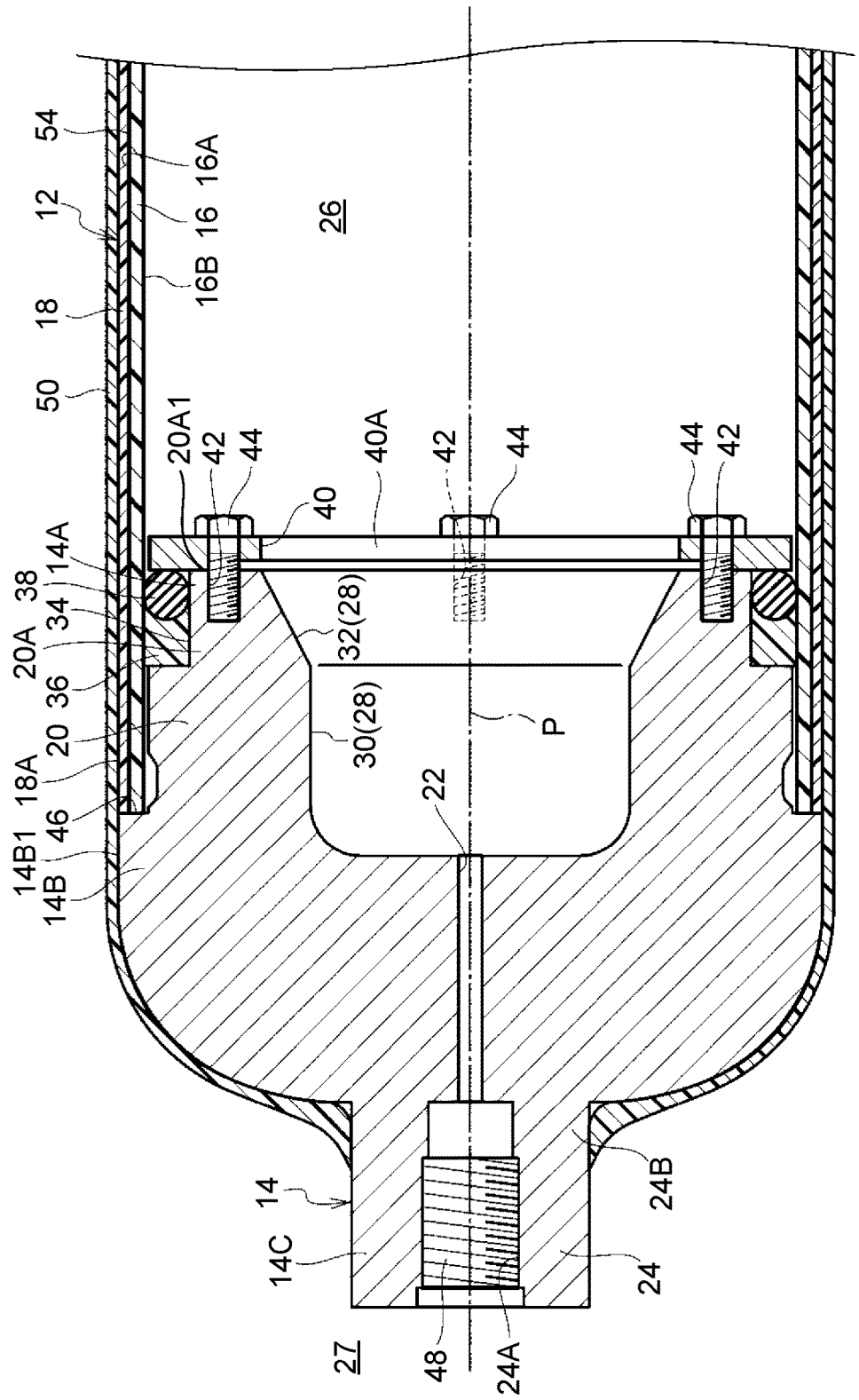
FIG. 2 is an enlarged sectional view taken along line II-II in FIG. 1.

As illustrated in FIG. 2, the high-pressure tank 10 includes a body portion 12 having a generally cylindrical shape, and two ferrules 14 respectively disposed at opposite end portions of the body portion 12 in its axial direction (i.e., its longitudinal direction). The body portion 12 is configured to store a fluid (hydrogen, in the present embodiment) therein. The body portion 12 includes a liner 16 having a generally cylindrical shape, and an outer layer 18 with which the outer periphery of the liner 16 is covered.

In the present embodiment, the liner 16 is made of, for example, a nylon resin having gas-barrier properties. The outer layer 18 is made of a carbon fiber-reinforced plastic (CFRP) in a sheet form. In other words, the liner 16 is made of a first resin having a linear expansion coefficient that is higher than that of the outer layer 18. Further, in the present embodiment, the outer layer 18 is joined to an outer peripheral surface 16A of the liner 16 through, for example, welding or bonding, such that the outer peripheral surface 16A of the liner 16 is covered with the outer layer 18. In this way, the outer layer 18 is jointed to the liner 16 in an integrated manner.

Each ferrule 14 has a generally columnar shape. The ferrule 14 includes an insertion portion 20 and a projection portion 24. The ferrule 14 has a communication passage 22 provided therein The insertion portion 20 is provided on a first end 14A-side of the ferrule 14 in its longitudinal direction. The insertion portion 20 has an outer diameter that is less than that of a central portion 14B of the ferrule 14 in its longitudinal direction. The insertion portion 20 is configured be inserted into the body portion 12. The insertion portion 20 has a recess 28 that opens toward an internal space 26 of the body portion 12 (the liner 16).

The recess 28 includes a columnar recess 30 having a generally columnar shape, and a tapered portion 32 having a tapered shape. The tapered portion 32 is close to the internal space 26 of the body portion 12, and the columnar recess 30 is distant from the internal space 26 of the body portion 12. The diameter of the tapered portion 32 gradually increases in a direction from the columnar recess 30 toward the internal space 26 of the body portion 12.

Providing the recess 28 in the ferrule 14 as described above makes the capacity of the high-pressure tank 10 greater than that when no recess 28 is provided in the ferrule 14.

Further, an end portion 20A of the insertion portion 20 of each ferrule 14 has a holding portion 34. The holding portion 34 has an outer diameter that is less than that of the remaining portion of the insertion portion 20. In a sectional view of an upper-side portion of the ferrule 14 illustrated in FIG. 2, the holding portion 34 and an axially-end surface of the remaining portion of the insertion portion 20 form a generally L-shape. For example, a backup ring 36 and an O-ring 38 (an example of a seal member) are held on the holding portion 34.

A holding plate 40 having an annular shape is in contact with an end surface 20A1 of the insertion portion 20, with the backup ring 36 and the O-ring 38 held on the holding portion 34. Threaded holes 42 (e.g., four threaded holes 42, in the present embodiment) are provided in the end portion 20A of the insertion portion 20, so that bolts 44 can be screwed into the threaded holes 42. The holding plate 40 is secured to the ferrule 14 with the bolts 44, with the holding plate 40 kept in contact with the end surface 20A1 of the insertion portion 20.

As described above, the holding plate 40 is secured to the ferrule 14, so that the backup ring 36 and the O-ring 38 are prevented from being detached from the holding portion 34. A hole 40A provided in the holding plate 40 has a diameter corresponding to the greatest diameter of the tapered portion 32 of the recess 28.

The backup ring 36 and the O-ring 38 are pressed against (fitted to) an inner peripheral surface 16B of the liner 16, with the insertion portion 20 of the ferrule 14 inserted in the body portion 12 (i.e., with the insertion portion 20 of the ferrule 14 disposed radially inward of the inner peripheral surface 16B of the liner 16). That is, the O-ring 38 seals a gap between the ferrule 14 and the inner peripheral surface 16B of the liner 16 to prevent leakage of the fluid stored in the liner 16.

As described above, the insertion portion 20 of each ferrule 14 has an outer diameter that is less than the outer diameter of the central portion 14B of the ferrule 14. That is, a step portion 46 is provided between the central portion 14B and the insertion portion 20 of the ferrule 14. One end of each of the liner 16 and the outer layer 18 in the longitudinal direction thereof is in contact with the step portion 46, with the insertion portion 20 of the ferrule 14 disposed in the liner 16. In this state, an outer peripheral surface 14B1 of the central portion 14B of the ferrule 14 and an outer peripheral surface 18A of the outer layer 18 are substantially flush with each other.

The communication passage 22 is provided in the central portion 14B of each ferrule 14 in the longitudinal direction. The communication passage 22 extends through the ferrule 14 along a central axis P of the ferrule 14. The communication passage 22 provides communication between the internal space 26 of the liner 16 (i.e., an internal space of the high-pressure tank 10) and an outside 27 of the high-pressure tank 10.

The projection portion 24 is provided on a second end 14C-side of each ferrule 14 in its longitudinal direction. The projection portion 24 projects along the central axis P of the ferrule 14. The projection portion 24 has a generally cylindrical shape, so that an internal space of the projection portion 24 is in communication with the communication passage 22. An internal thread portion 48 is provided on an inner peripheral surface 24A of the projection portion 24.

A connecting pipe connected to communication passages of a plurality of other high-pressure tanks (not illustrated) can be connected to the projection portion 24. When the connecting pipe (not illustrated) is connected to the projection portion 24, internal spaces of body portions of the high-pressure tanks are communicated with each other. The connecting pipe is provided with a valve (not illustrated), so that the amount of fluid flowing through the connecting pipe can be adjusted. The connecting pipe is connected to, for example, a fuel cell stack (not illustrated).

As illustrated in FIG. 1, a reinforcement layer 50 is provided on the radially-outer side of the outer layer 18 and at least a part of an outer surface of each of the two ferrules 14. The reinforcement layer 50 is made of carbon fiber-reinforced plastic (CFRP) containing a plurality of fibers 52. In FIG. 1, the thickness of each fiber 52 is exaggerated in order to make it easier to recognize the fibers 52, and the number of fibers 52 is less than the actual number of fibers 52 in order to make it easier to recognize the fibrous direction of each fiber 52.

The fibers 52 of the reinforcement layer 50 are wound around a portion of the ferrule 14 that is close to a base portion 24B of the projection portion 24, and then linearly wound around the outer layer 18 of the body portion 12. More specifically, the fibers 52 is wound around the portion of one of the ferrules 14 that is close to the base portion 24B of the projection portion 24, and is then wound around the outer layer 18 of the body portion 12 (see FIG. 2) while extending toward the other ferrule 14 at a predetermined angle θ with respect to the axial direction of the body portion 12 (so-called "helical winding").

The reinforcement layer 50 enhances the pressure resistance of the high-pressure tank 10 itself in the axial direction. Because the fibers 52 are wound around the body portion 12 at the predetermined angle θ with respect to the axial direction of the body portion 12, the reinforcement layer 50 is restrained from being detached from the body portion 12. The above-described manner of winding the fibers 52 of the reinforcement layer 50 is just one example, and the manner of winding the fibers 52 is not limited to the above-described manner.

Operation and Advantageous Effects of High-Pressure Vessel

Next, the operation and advantageous effects of the high-pressure tank 10, which is an example of the high-pressure vessel according to the present embodiment, will be described.

Figure 3:
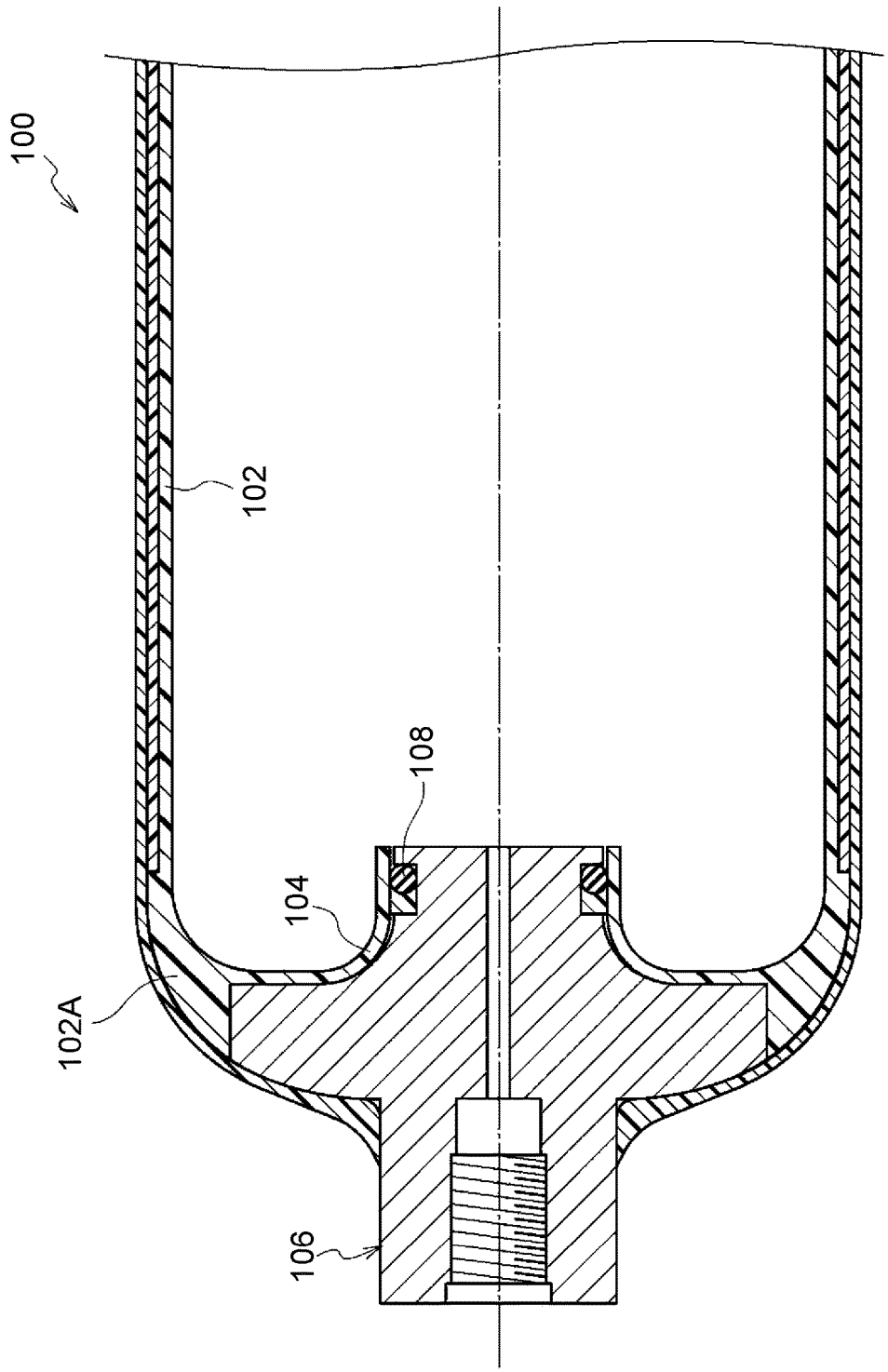
FIG. 3 is an enlarged sectional view illustrating a high-pressure vessel according to a comparative example, FIG. 3 corresponding to FIG. 2.

First, a high-pressure tank 100 according to a comparative example will be described with reference to FIG. 3. In the high-pressure tank 100, an end portion 102A of a liner 102 is provided with a folded-back portion 104 folded back inwardly, and a ferrule 106 is inserted into the folded-back portion 104. An O-ring 108 is disposed between the folded-back portion 104 and the ferrule 106. The O-ring 108 prevents leakage of a fluid stored in the liner 102.

In this comparative example, the end portion 102A of the liner 102 is provided with the folded-back portion 104. This configuration makes the shape of the liner 102 itself complicated.

In contrast to this, in the present embodiment, the liner 16 has a cylindrical shape as illustrated in FIG. 2. That is, the liner 16 has a simple shape. Therefore, the liner 16 can be produced by a simple method, such as extrusion molding. This reduces the production cost. Further, producing the liner 16 through extrusion molding enables the liner 16 to be thin. Thus, the high-pressure tank 10 can be made lighter.

In the present embodiment, the outer layer 18 is joined to the outer peripheral surface 16A of the liner 16, so that the liner 16 and the outer layer 18 are joined to each other in an integrated manner. Further, the insertion portion 20 of the ferrule 14 is at least partly disposed radially inward of the inner peripheral surface 16B of the liner 16. In addition, the O-ring 38 is disposed between the inner peripheral surface 16B of the liner 16 and the insertion portion 20 of the ferrule 14.

The liner 16 is made of the first resin having a linear expansion coefficient that is higher than that of the outer layer 18 (i.e., a fiber-reinforced resin). A commonly-used resin (a nylon resin, in the present embodiment) and a fiber-reinforced resin greatly differ in linear expansion coefficient from each other. A fiber-reinforced resin has a low linear expansion coefficient and thus expansion and shrinkage thereof due to temperature changes hardly occur, whereas a commonly-used resin expands and shrinks due to temperature changes.

For example, although not illustrated, if the liner 16 and the outer layer 18 made of a fiber-reinforced resin are not joined to each other in an integrated manner, the liner 16 expands and shrinks in the axial direction with respect to the outer layer 18. At high temperatures, expansion of the liner 16 may be restrained by the reinforcement layer 50. However, at low temperatures, the liner 16 shrinks in the axial direction. However, in the present embodiment, the outer layer 18 is joined to the liner 16 in an integrated manner. Thus, shrinkage of the liner 16 in the axial direction can be restrained by the outer layer 18. Thus, expansion and shrinkage of the liner 16 in the axial direction are restrained by the outer layer 18.

In the present embodiment, the O-ring 38 is disposed between the inner peripheral surface 16B of the liner 16 and the insertion portion 20 of each ferrule 14, as described above. Thus, for example, when the liner 16 expands and shrinks, the O-ring 38 slides in response to expansion and shrinkage of the liner 16, resulting in abrasion of the O-ring 38. However, in the present embodiment, the liner 16 and the outer layer 18 are jointed to each other in an integrated manner, so that expansion and shrinkage of the liner 16 are restrained by the outer layer 18. As a result, the O-ring 38 is restrained from sliding. Consequently, the sealability between the inner peripheral surface 16B of the liner 16 and the insertion portion 20 of each ferrule 14 can be maintained. In other words, according to the present embodiment, it is possible to employ the liner 16 having a simple shape while maintaining sufficient sealability.

In the present embodiment, the outer peripheral surface 16A of the liner 16 is covered with the outer layer 18, and thus a contact site 54 where the outer layer 18 is in contact with the liner 16 covers substantially the entirety of the outer peripheral surface 16A of the liner 16. Because the outer layer 18 is joined to the liner 16 over the entirety of the contact site 54 in the present embodiment, expansion and shrinkage of the entirety of the liner 16 are restrained. Note that the contact site 54 need not cover substantially the entirety of the outer peripheral surface 16A of the liner 16.

In the present embodiment, the liner 16 is made of a nylon resin. However, the material of the liner 16 is not limited to a nylon resin, as long as the liner is made of a material that restrains the gas stored in the body portion 12 from permeating through the liner 16.

In the present embodiment, the outer layer 18 is made of a fiber-reinforced resin. However, the material of the outer layer 18 is not limited to a fiber-reinforced resin, as long as the outer layer 18 is made of a resin having a linear expansion coefficient that is lower than the linear expansion coefficient of the liner 16.

In the present embodiment, hydrogen is stored in the internal space 26 of the high-pressure tank 10. However, the fluid stored in the high-pressure tank 10 is not limited to hydrogen, and another kind of gas or a liquid, such as LPG, may be stored in the high-pressure tank 10.

While one example embodiment of the disclosure has been described, it is to be understood that the disclosure is not limited to the example embodiment and various modifications and changes may be made to the foregoing embodiment within the technical scope of the appended claims.

What is claimed is:

1. A high-pressure vessel comprising:
   a liner having a cylindrical shape, the liner being made of a first resin;
   an outer layer joined to an outer peripheral surface of the liner, the outer layer being made of a second resin having a linear expansion coefficient that is lower than a linear expansion coefficient of the first resin;
   a ferrule made of metal, the ferrule being at least partly disposed radially inward of an inner peripheral surface of the liner, and the ferrule being configured to provide communication between an internal space of the high-pressure vessel and an outside of the high-pressure vessel; and
   a seal member disposed between the inner peripheral surface of the liner and the ferrule, and the seal member being configured to seal a gap between the inner peripheral surface of the liner and the ferrule.

2. The high-pressure vessel according to claim 1, wherein the outer layer is joined to the liner so as to cover the liner from an outer side, such that the outer peripheral surface of the liner contacts an inner surface of the outer layer over an entirety of a contact site where the outer layer and the liner are in contact with each other.

3. The high-pressure vessel according to claim 1, wherein:
   the ferrule includes an insertion portion provided on a first end side of the ferrule, a projection portion provided on a second end side of the ferrule, the second end side being on an opposite side of the ferrule from the first end side, and a central portion provided between the insertion portion and the projection portion, the insertion portion being inserted into the liner; and
   an outer diameter of the insertion portion is less than an outer diameter of the central portion.

4. The high-pressure vessel according to claim 3, wherein:
   the insertion portion includes a holding portion having an outer diameter that is less than an outer diameter of the remaining portion of the insertion portion; and
   the seal member is disposed on the holding portion.

5. The high-pressure vessel according to claim 3, wherein:
   the ferrule includes a step portion extending in a radial direction of the ferrule, the step portion being located between the central portion and the insertion portion; and
   one end of each of the liner and the outer layer in a longitudinal direction of the liner and the outer layer is in contact with the step portion.

6. The high-pressure vessel according to claim 5, further comprising a reinforcement layer made of a carbon fiber-reinforced resin, the reinforcement layer being disposed radially outward of the outer layer.

7. The high-pressure vessel according to claim 6, wherein the reinforcement layer is provided on an outer peripheral surface of the central portion of the ferrule and at least a part of an outer peripheral surface of the projection portion of the ferrule.

8. The high-pressure vessel according to claim 4, further comprising a holding plate having an annular shape, the holding plate being secured to an end surface of the insertion portion.

9. The high-pressure vessel according to claim 8, wherein:
the holding portion is provided on the first end side of the insertion portion such that the end surface of the insertion portion to which the holding plate is secured is an end surface of the holding portion; and
an outer diameter of the holding plate is greater than the outer diameter of the holding portion.

10. The high-pressure vessel according to claim 6, the high-pressure vessel comprising two ferrules, wherein:
one of the two ferrules is disposed at the one end of each of the liner and the outer layer in the longitudinal direction; and
the other one of the two ferrules is disposed at the other end of each of the liner and the outer layer in the longitudinal direction.

* * * * *